(12) United States Patent
Lemkin et al.

(10) Patent No.: US 6,253,612 B1
(45) Date of Patent: Jul. 3, 2001

(54) GENERATION OF MECHANICAL OSCILLATION APPLICABLE TO VIBRATORY RATE GYROSCOPES

(75) Inventors: Mark A. Lemkin; Thor N. Juneau, both of Berkeley; William A. Clark, Fremont; Allen W. Roessig, Albany, all of CA (US)

(73) Assignee: Integrated Micro Instruments, Inc., Berkeley, CA (US)

( * ) Notice: Subject to any disclaimer, the term of this patent is extended or adjusted under 35 U.S.C. 154(b) by 0 days.

(21) Appl. No.: 09/322,840

(22) Filed: May 28, 1999

Related U.S. Application Data

(60) Provisional application No. 60/088,179, filed on Jun. 5, 1998.

(51) Int. Cl.$^7$ .................................................. G01C 19/00

(52) U.S. Cl. ........................................................ 73/504.02

(58) Field of Search ............................ 73/504.12, 504.14, 73/504.04, 504.03, 504.02

(56) References Cited

U.S. PATENT DOCUMENTS

| | | |
|---|---|---|
| 3,798,572 | 3/1974 | Weiss . |
| 3,978,649 | 9/1976 | Naito . |
| 4,003,000 | 1/1977 | Sordello et al. . |
| 4,104,599 | 8/1978 | Tagawa . |
| 4,646,033 | 2/1987 | Perkins . |
| 5,025,346 | 6/1991 | Tang et al. . |
| 5,383,362 | 1/1995 | Putty et al. . |
| 5,600,064 | 2/1997 | Ward . |
| 5,604,309 | 2/1997 | Ward . |
| 5,608,351 | 3/1997 | Ward . |
| 5,616,864 | 4/1997 | Johnson et al. . |
| 5,621,171 | 4/1997 | Fell . |
| 5,635,787 | 6/1997 | Mori et al. . |
| 5,652,374 | 7/1997 | Chia et al. . |
| 5,672,949 | 9/1997 | Ward . |
| 5,696,322 | 12/1997 | Mori et al. . |
| 5,747,961 | * 5/1998 | Ward et al. ............................ 318/646 |
| 5,918,280 | * 6/1999 | Gang et al. ........................ 73/504.12 |
| 5,983,718 | * 11/1999 | Wyse et al. ........................ 73/504.12 |

OTHER PUBLICATIONS

Clark, W.A., Howe, R.T., Horowitz, R., "Surface Micromachined Z–axis Vibratory Rate Gyroscope," *IEEE Solid–State Sensor and Actuator Workshop*, Hilton Head Island, SC, pp. 283–287, Jun. 1996.

Juneau, T., Pisano, A.P., "Micromachined Dual Input Axis Angular Rate Sensor," *IEEE Solid–State Sensor and Actuator Workshop*, Hilton Head Island, SC, pp. 299–302, Jun. 1996.

Clark, W.A., Micromachined Vibratory Rate Gyroscopes, Doctoral Dissertation, University of California, 1997.

Juneau, T.N., Micromachined Dual Input Axis Rate Gyroscope, Doctoral Dissertation, University of California, 1997.

(List continued on next page.)

*Primary Examiner*—Richard A. Moller
(74) *Attorney, Agent, or Firm*—Fliesler, Dubb, Meyer & Lovejoy LLP

(57) ABSTRACT

To achieve a drive-axis oscillation with improved frequency and amplitude stability, additional feedback loops are used to adjust force-feedback loop parameters.

An amplitude-control loop measures oscillation amplitude, compares this value to the desired level, and adjusts damping of the mechanical sense-element to grow or shrink oscillation amplitude as appropriate. A frequency-tuning loop measures the oscillation frequency, compares this value with a highly stable reference, and adjusts the gain in the force-feedback loop to keep the drive-axis oscillation frequency at the reference value. The combined topology simultaneously controls both amplitude and frequency. Advantages of the combined topology include improved stability, fast oscillation start-up, low power consumption, and excellent shock rejection.

24 Claims, 12 Drawing Sheets-

OTHER PUBLICATIONS

Roessig, T.A.W., Integrated MEMS Tuning Fork Oscillators for Sensor Applications, Doctoral Dissertation, University of California, 1998.

Geen, J.A., "A Path to Low Cost Gyroscopy," *IEEE Solid–State Sensor and Actuator Workshop*, Hilton Head Island, SC, pp. 51–54, Jun. 1998.

* cited by examiner

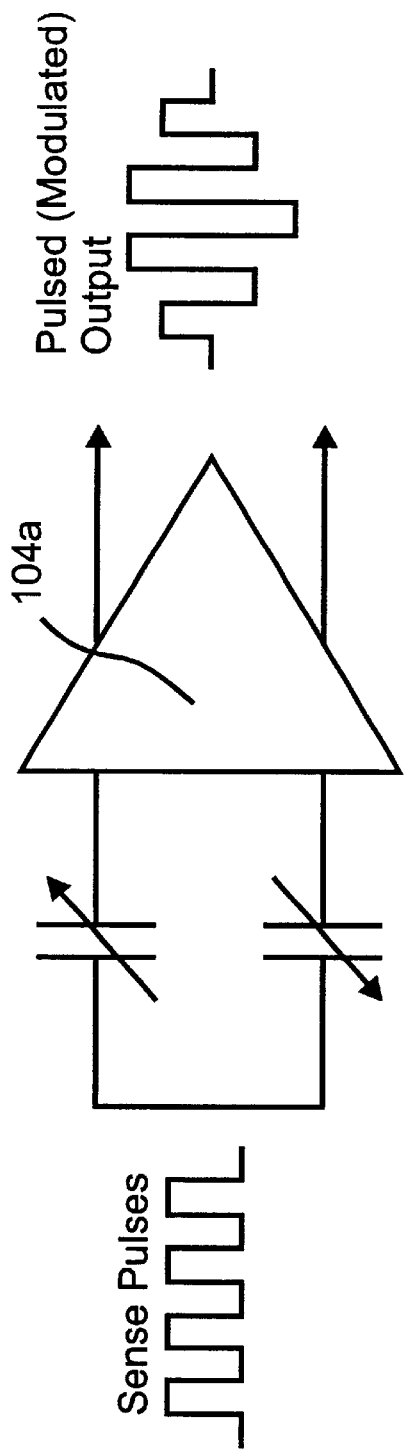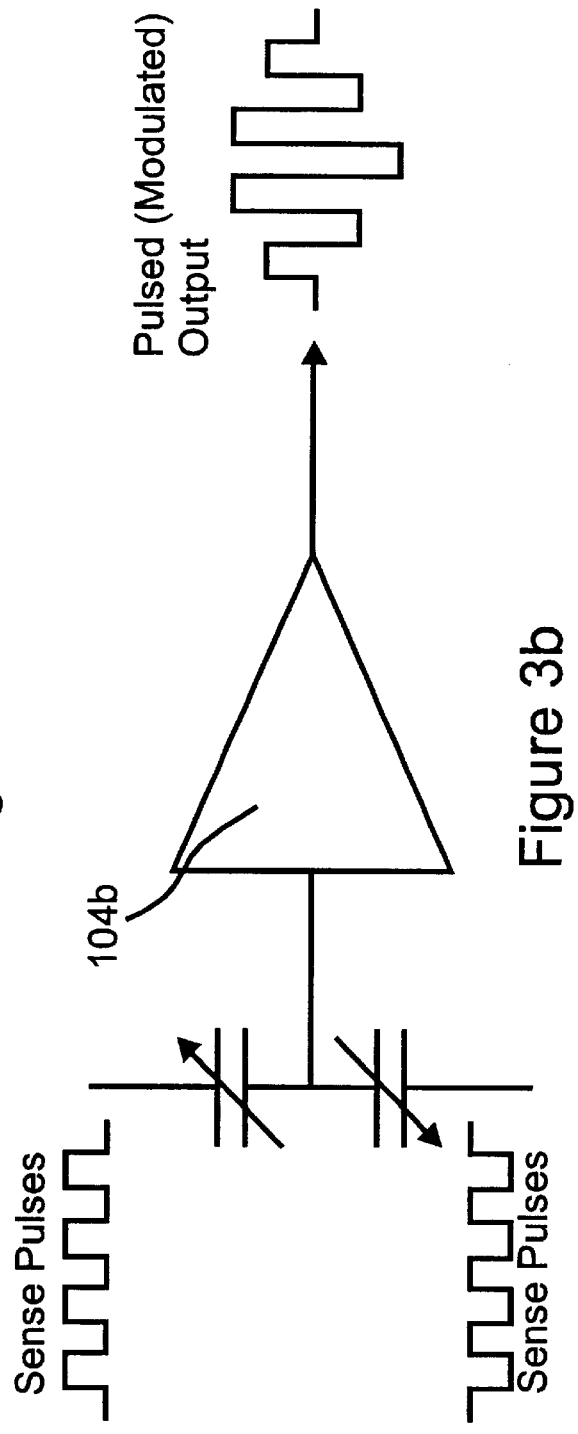
Figure 3a
Figure 3b

GENERATION OF MECHANICAL OSCILLATION APPLICABLE TO VIBRATORY RATE GYROSCOPES

PRIOR APPLICATION DATA

This application claims the benefit of U.S. Provisional application Ser. No. 60/088,179 filed Jun. 5, 1998.

IDENTIFICATION OF GOVERNMENT INTEREST

This invention was made with Government support under NAS5-97227 awarded by the National Aeronautics and Space Administration (NASA). The Government has certain rights in the invention.

FIELD OF THE INVENTION

This invention relates generally to oscillating microstructures and more particularly to vibratory rate gyroscopes, which require a mechanical oscillation to measure rotation rate.

BACKGROUND OF THE INVENTION

Rate gyroscopes are sensors that measure rotation rate. Rate gyroscopes have uses in many commercial, military, and scientific applications including, but not limited to, inertial navigation, vehicular skid control, and platform stabilization.

A vibratory rate gyroscope is a sensor that responds to rotation rate by generating and measuring Coriolis acceleration. Coriolis acceleration is generated by any object (such as a proof-mass) that has a non-zero velocity relative to a rotating reference frame. In vibratory rate gyroscopes, one or more proof-masses are suspended by springs and made to oscillate. This driven-mode oscillation supplies the velocity necessary to generate Coriolis acceleration under an input rotation. The component of Coriolis acceleration along an axis, y, is given by:

$$a_y = 2\Omega_z(t) D_x \omega_x \cos(\omega_x t) \quad \text{(Equation 1)}$$

where x, y, and z are three mutually orthogonal axes, $\Omega_z$ is the input rotation rate about the z-axis, $\omega_x$ is the driven mode oscillation frequency, $D_x$ is the displacement amplitude of the oscillation in the driven mode, and ay is the resulting Coriolis acceleration. If the amplitude, $D_x$, and driven-mode frequency, $\omega_x$, are known, measurement of the Coriolis acceleration may be used to estimate the rotation rate of the sensor.

As shown in Equation 1, the Coriolis acceleration is directly proportional to the rotation-rate input, the magnitude of the drive-mode oscillation, and the frequency of the drive-mode oscillation. Changes in driven-mode oscillation frequency that occur over time or with temperature cause first-order errors in the sensor output, as do variations in the amplitude of this oscillation. For a high-stability gyroscope, the oscillation amplitude and frequency must both be precisely controlled.

Operation of a gyroscope in a vacuum is often desirable to minimize both noise and resistance to oscillation. Note that in a vacuum, the lack of mechanical damping may cause large variations in the magnitude of the driven-mode oscillation in response to mechanical shocks or external accelerations. In addition, the high mechanical quality-factor of vibrational modes in vacuum result in output errors that last long after the source of disturbance has been removed. Thus, it is clear that methods that do not actively control the amplitude of the drive-mode oscillation will achieve poor performance in the face of external disturbance.

Oscillation of the gyroscope may be both forced and detected using variable air-gap capacitors. Electrostatic forces result between charged capacitor plates. The magnitude and direction of the force is given by the gradient of the potential energy function for the capacitor as shown below.

$$\vec{F} = -\nabla U = -\nabla \left[ \frac{Q^2}{2C(x, y, z)} \right] \quad \text{Equation 2}$$

To generate a appropriate oscillation in a gyroscope, a force along a single axis, the X-axis for example, is required. Equation 2 implies that any capacitor that varies with displacement along the X-axis will generate an appropriate force. An implementation of a pair of such capacitors is shown in FIG. 1. This capacitor configuration has a number of advantages including ample room for large displacements along the X-axis without collisions between comb fingers. By applying differential voltages with a common mode bias $V_{DC}$ across electrically conductive comb fingers 102, 103a and 102,103b, a force that is independent of X-axis displacement and linear with control voltage, $v_x$ is created:

$$V_1 = V_{DC} - v_x \quad \text{Equation 3}$$
$$V_2 = V_{DC} + v_x$$
$$F_x = \frac{1}{2} \frac{\partial C}{\partial x} V_2^2 - \frac{1}{2} \frac{\partial C}{\partial x} V_1^2 = 2 \frac{C_0}{X_0} V_{DC} v_x$$

where $C_0$ and $X_0$ are the capacitance and X-axis overlap of the air-gap capacitors at zero displacement respectively. An alternative method of applying forces chooses $V_1$, $V_2$ such that:

$$V_1 = V_{DC} - v_x$$
$$V_2 = -V_{DC} - v_x \quad \text{(Equation 4)}$$

Note that in both of these cases the magnitude of the force is proportional to the control voltage, $v_x$, and the DC bias voltage, $V_{DC}$. This permits the magnitude of the force to be linearly controlled by varying either $v_x$ or $V_{DC}$ while maintaining the other voltage constant.

A second configuration achieving the desired goal of applying force along a single axis is shown in FIG. 2. This method uses sets of interdigitated comb fingers 103c, 102b, 103d to apply forces in the positive and negative directions. The net forces on the proof-mass at zero displacement are given by:

$$F_x = \frac{1}{2} \frac{\partial C}{\partial x} V_2^2 - \frac{1}{2} \frac{\partial C}{\partial x} V_1^2 = 2 \frac{C(x)}{x}\bigg|_{x=X_0} V_{DC} v_x \quad \text{Equation 5}$$

where $V_1$, $V_2$ are as defined in either Equation 3 or 4. Note that while the forces are linear with applied voltage $v_x$ or $V_{DC}$, the forces are highly dependent on the proof-mass displacement, resulting in poor performance over even small motions. This problem may be surmounted by controlling charges instead of voltages on the two capacitors. Given bias and control charges $Q_{DC}$ and $q_x$, the resulting force may be found to equal:

$$Q_1 = Q_{DC} - q_x \quad \text{Equation 6}$$

$$Q_2 = Q_{DC} + q_x$$

$$F_x = \frac{1}{2}\frac{Q_2^2}{\varepsilon_0 A} - \frac{1}{2}\frac{Q_1^2}{\varepsilon_0 A} = \frac{2}{\varepsilon_0 A}Q_{DC}q_x$$

where $\varepsilon_0$ and A are the permittivity of free space and overlap area of the interdigitated comb fingers respectively. The above equations show that the nonlinearity with displacement is thus avoided.

Sensing of driven mode deflections may be attained by measuring capacitance. There are two approaches commonly taken in a capacitive sensing. In the first approach, illustrated in FIG. 3(a) and FIG. 3(b), a changing voltage is applied to two nominally equal-sized capacitors. Any imbalance between these capacitors results in charge that is measured by a sense interface 104a,b. The second method, illustrated in FIG. 3(c) and FIG. 3(d), uses a constant DC bias voltage applied across the capacitors. Any change in the capacitance values results in current flow that is detected by a sense interface 104c,d. Both methods are illustrated in FIG. 3 with differential (FIG. 3(a) and (c)) and single-ended (FIG. 3(b) and (d)) sense interfaces. The capacitors, which vary with X-axis or driven-mode displacements, are similar to those shown in FIG. 1 or FIG. 2.

The sense interfaces or sense amplifiers discussed above usually take the form of either a transresistance amplifier, a voltage buffer, or a charge integrator. Simplified, single-ended configurations of these topologies are shown in FIG. 4(a), (b), and (c) respectively. The transresistance amplifier converts input current to an output voltage whereas the voltage buffer and integrator convert input charge to an output voltage when connected to a capacitor bridge circuit.

The trans resistance amplifier may be used with a DC sense voltage to yield a measure of the proof-mass velocity. Velocity is measured because the current generated by deflections in the capacitor bridge circuit is a function of velocity. The voltage buffer and charge integrator measure the deflection of the proof-mass in both the pulsed and DC bias configurations.

Provided with a controllable force applied to a structure and a measure of the structure's deflection, the structure may be driven into oscillation using feedback. Desired oscillation is achieved by measuring the structure's displacement or velocity then determining the magnitude and/or direction of the force to apply to the structure. The measurement of the structure's displacement and the force applied may be electrostatic as described above. The measurement of the structure's displacement may be fed back as a force either directly or filtered depending on the nature of the oscillation loop.

SUMMARY OF THE INVENTION

Oscillation of a proof-mass is achieved using force-feedback representative of proof-mass position. To achieve oscillation with improved frequency and amplitude stability, additional feedback loops may be used to adjust the force-feedback loop parameters. The invention is a force-feedback system for increasing oscillation stability in rate gyroscopes and other sensors and actuators including resonators, resonant accelerometers, and microengines, and of which there are three embodiments: 1) an amplitude-control system, 2) a frequency-tuning system, and 3) a combined amplitude-control and frequency-tuning system. An amplitude-control system embodiment controls oscillation amplitude, while a frequency-tuning system embodiment controls oscillation frequency. Either embodiment may be used alone or in conjunction with one another to enhance gyroscope performance.

The amplitude-control feedback loop (ACL) varies the phase of the force-feedback signal to keep oscillation amplitude constant. The effect of this phase shift is to vary system damping thereby growing or shrinking amplitude as needed to keep the amplitude at a constant value. This method is in contrast to previous methods that have used a variable gain to adjust oscillation amplitude.

The frequency-tuning loop measures the oscillation frequency and compares this value with a stable reference. The frequency-tuning loop adjusts the gain in the force-feedback loop to keep the drive-axis oscillation frequency at the reference value. This loop attenuates errors arising from changes in the drive-axis resonant frequency, which may result over time or with temperature.

Simulations of a gyroscope with combined ACL and frequency-tuning loops show that the combined topology will accurately slave the proof-mass to a reference frequency while simultaneously maintaining amplitude stability. Advantages of the combined topology include improved stability, quick start up, low power consumption, and excellent shock rejection since positive damping may be added when the amplitude becomes too large.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout all the views of the drawings.

DETAILED DESCRIPTION OF THE INVENTION

Figure 1:
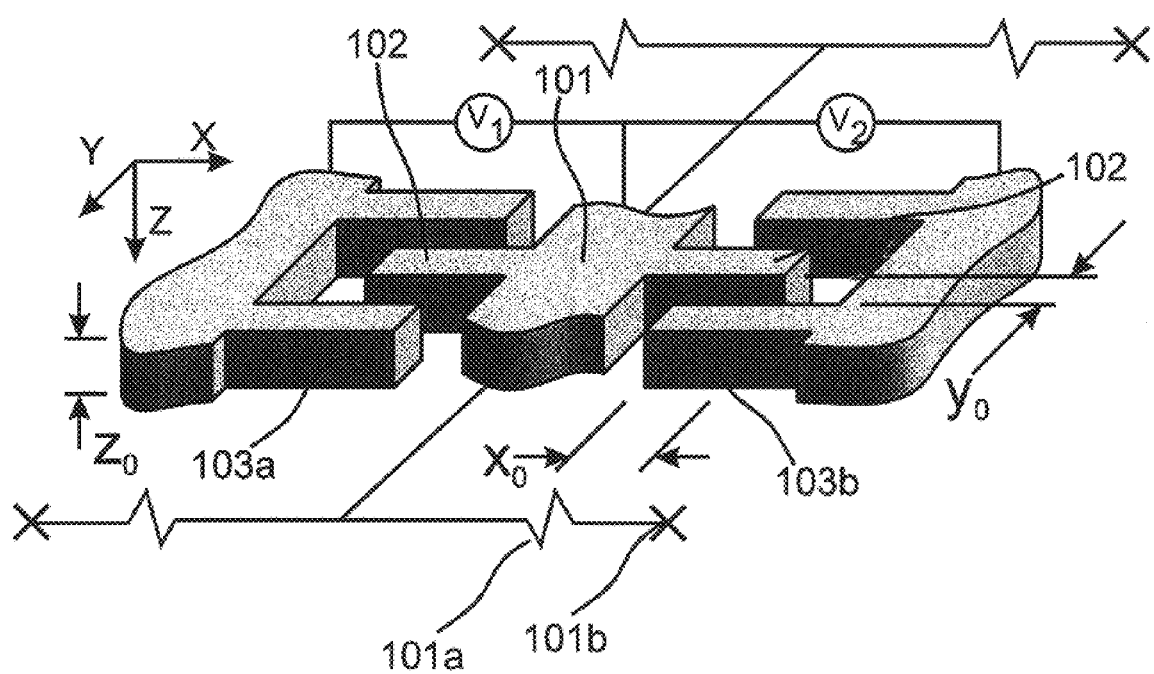
FIG. 1 is a plan view of a single set of comb-finger variable capacitors configured for applying electrostatic forces along a single axis.
Figure 2:
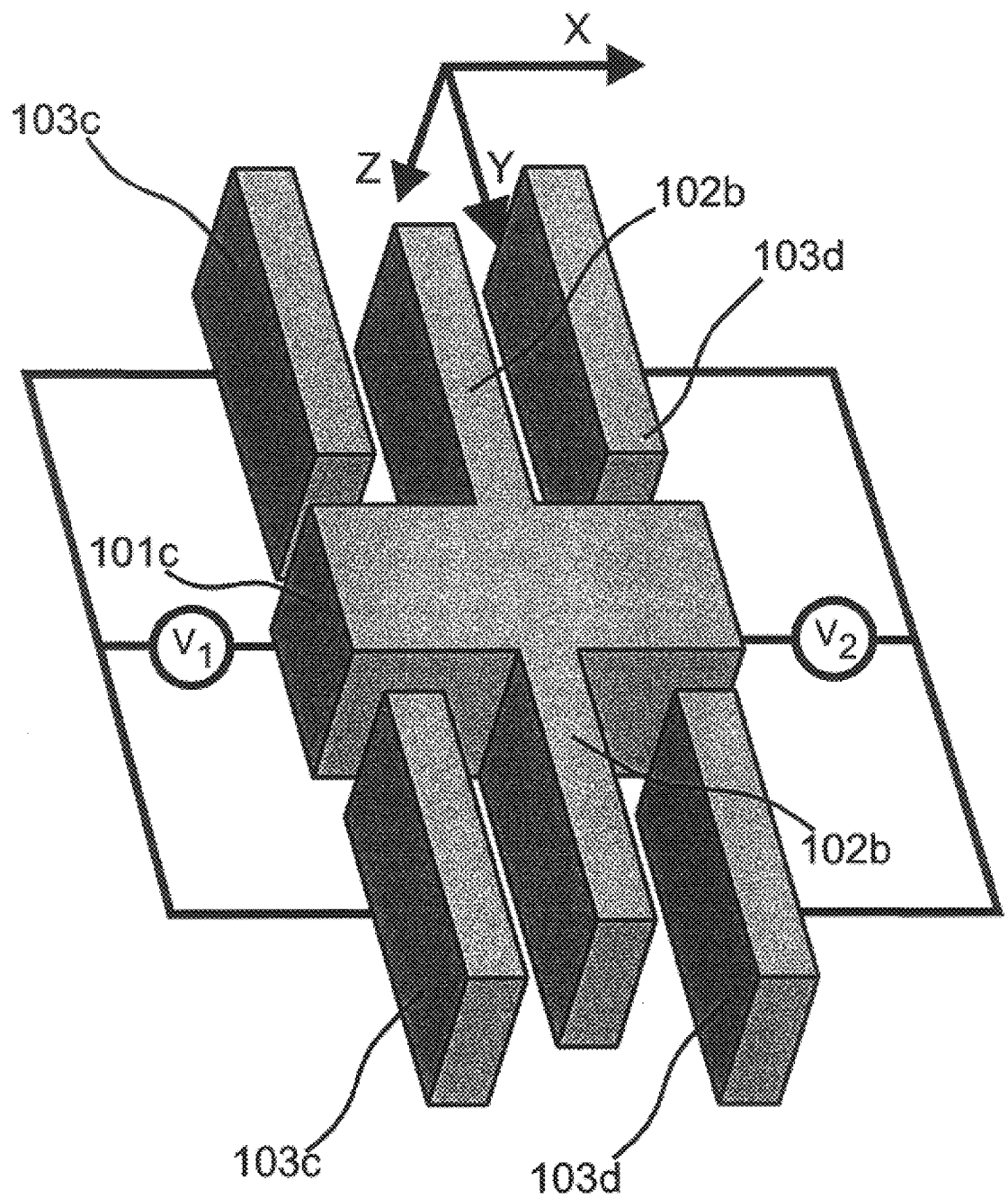
FIG. 2 is a plan view of a single set of interdigitated parallel-plate variable capacitors configured for applying electrostatic forces along a single axis.
Figure 3C:
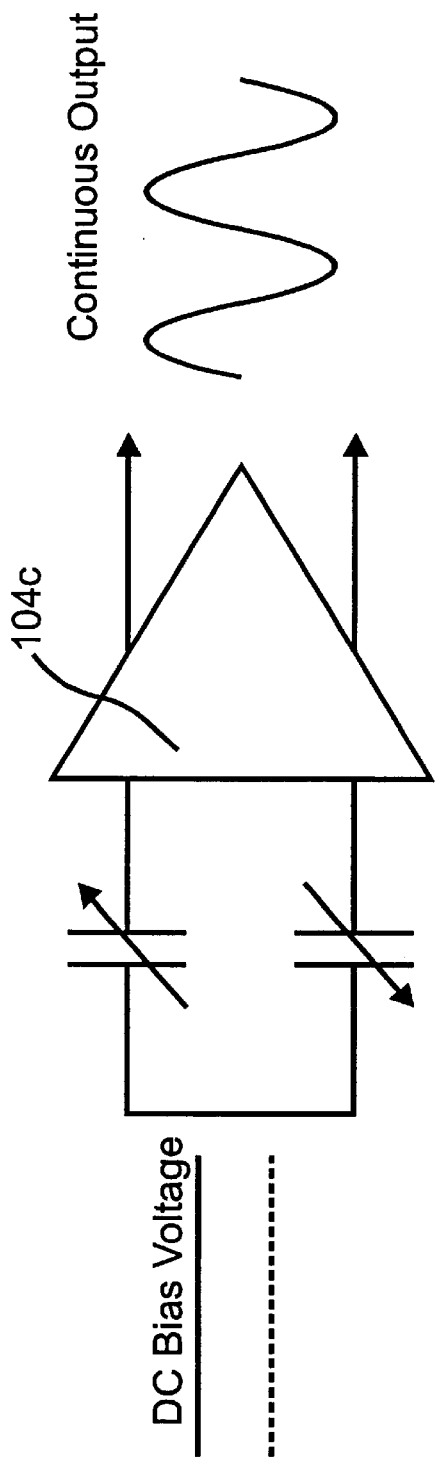
FIGS. 3(a–d) is a schematic diagram showing four methods of configuring the variable capacitors to a sense-interface for position detection including (a) differential charge, (b) single-ended charge, (c) differential current, (d) single-ended current.
Figure 3D:
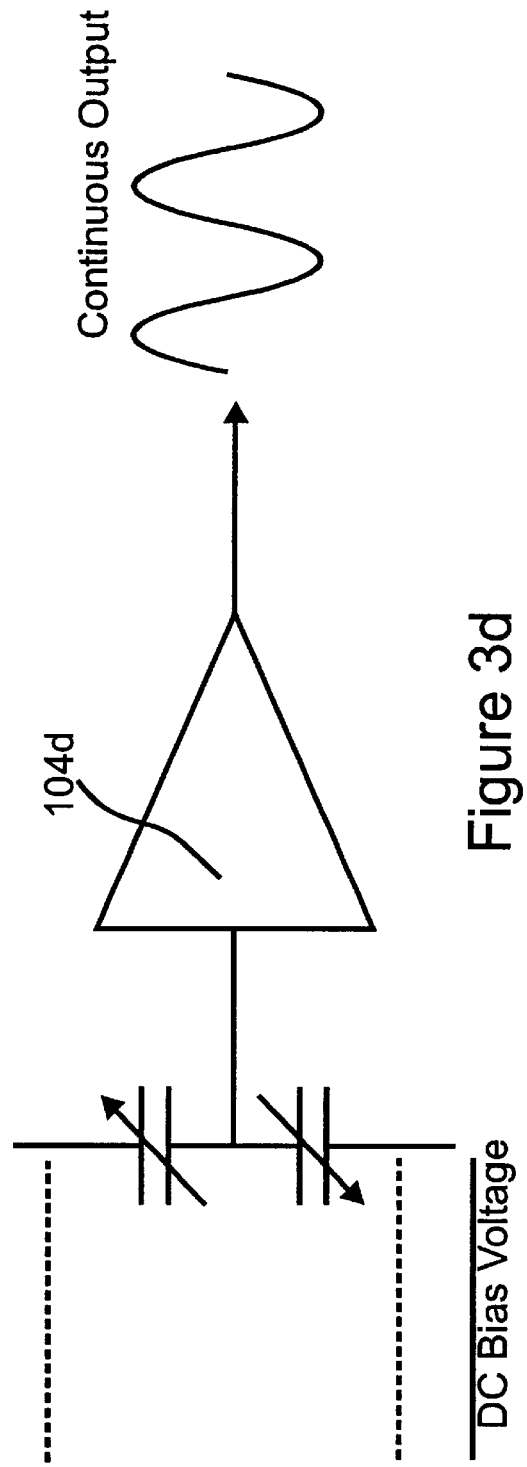
Figure 4A:
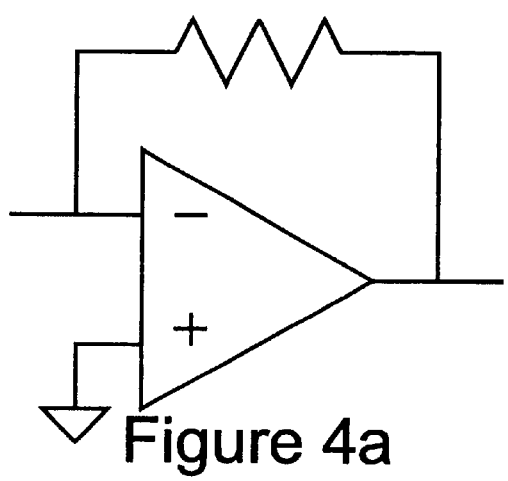
FIGS. 4(a,b,c) is a schematic diagram of three different methods for realizing a single-ended sense interface.
Figure 4B:
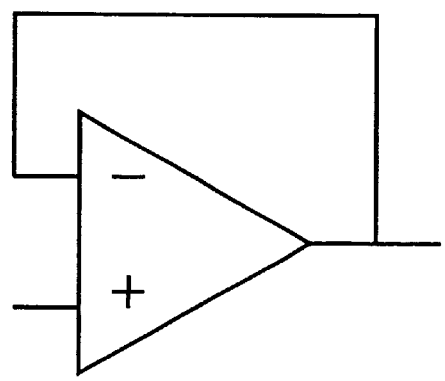
Figure 4C:
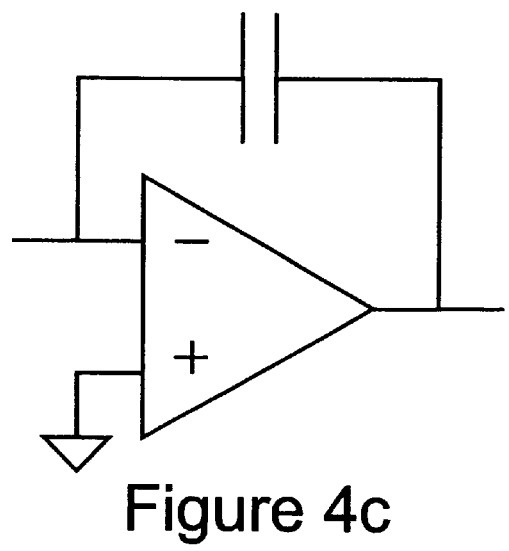

Oscillation of a gyroscope is achieved using force-feedback representative of proof-mass position. An electrical signal representative of proof-mass position may be obtained by measuring changes in air-gap capacitors. Electrostatic force feedback may be achieved by applying a voltage difference or charge across air-gap capacitors. Air gap capacitors may be similar to those shown in FIG. 1 and FIG. 2. Alternative embodiments include capacitors with values that vary in response to Y- or Z-axis translation or X-, Y-, or Z-axis rotation, thereby enabling displacement sensing and force-feedback along these directions. The drive capacitors may be realized with capacitors that are mechanically distinct from the sense capacitors. Alternatively, time- or frequency-multiplexing may be used to obtain both sense and drive functions out of a single set of air-gap capacitors (see Boser, B. E., Howe, R. T., "Surface micromachined accelerometers," IEEE JSSC, pp. 366–375, Mar. 1996; Lemkin, M., *Micro Accelerometer Design with Digital Feedback Control*, Doctoral Theesis, U. C. Berkeley, Fall 1997, for example). In the following description, sense-element 111 is comprised of a proof-mass 101 or 101c, movable electrodes 102 or 102b, electrodes fixed to the substrate 103a,b or 103c,d, and flexure elements 101a used to connect the proof-mass to a substrate at anchor points 101b.

The following embodiments for attaining oscillation apply equally to both single-mass and multiple-mass gyroscopes. The first two embodiments described below may be used alone or combined with one another, as described in the third embodiment, depending on the particular application needs.

Figure 5:
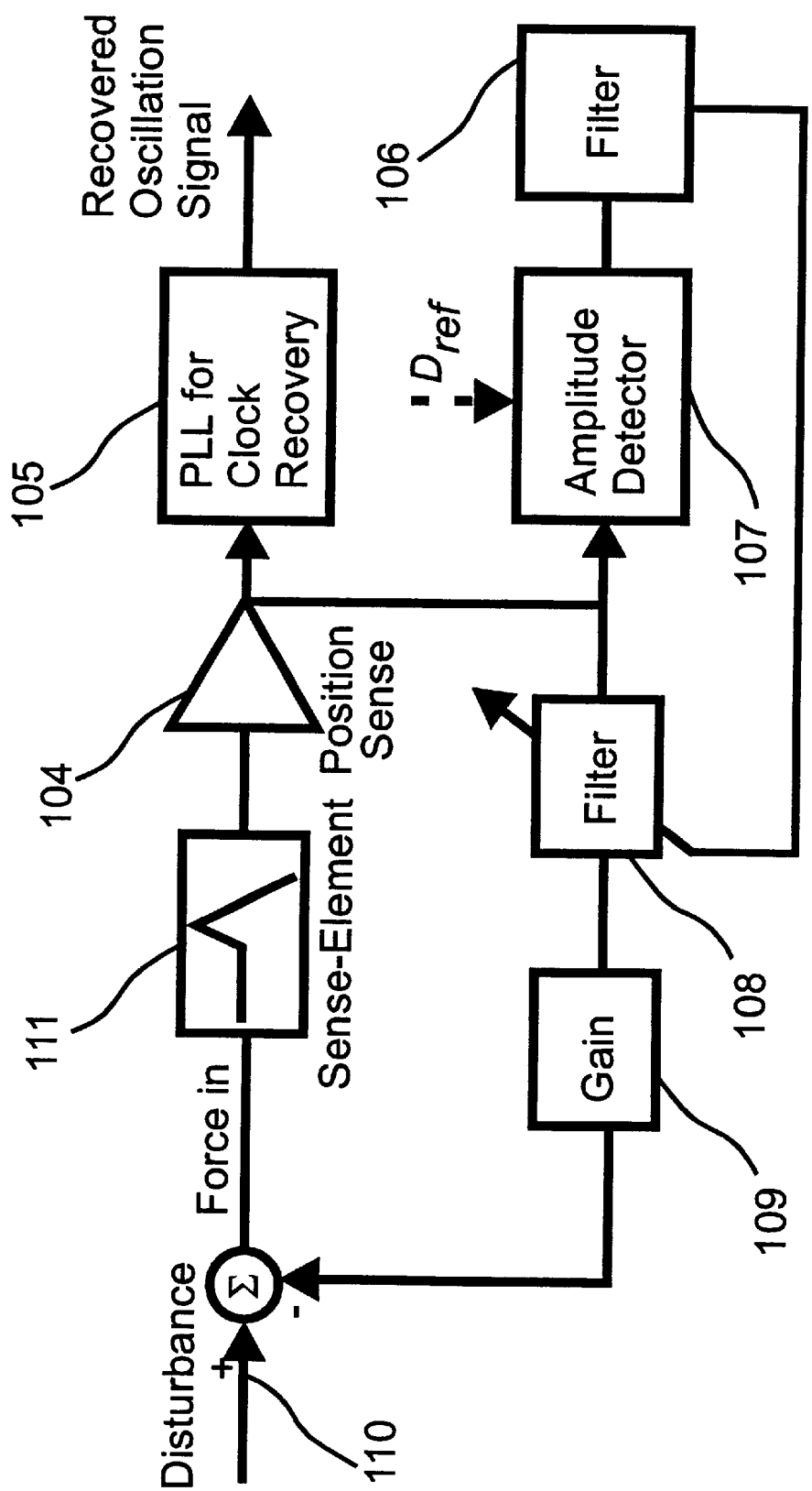
FIG. 5 is a block diagram showing important system elements and connections between these system elements comprising the amplitude-control loop embodiment.

A first embodiment of the present invention is shown in FIG. 5. In this embodiment, an amplitude-control loop (ACL) is used to maintain stable oscillation amplitude. This feedback loop, comprised of elements 104, 106, 107, 108, 109, and 111, measures a quantity representative of the oscillation amplitude of the sense-element 111 with a position-sense interface 104 in conjunction with a combination of amplitude detection circuitry 107 and filtering circuitry 106. The amplitude detector 107 may include a means for comparing a quantity representative of the oscillation amplitude with a quantity representative of a reference amplitude, $D_{ref}$. In this case, the output of the amplitude detector corresponds to the difference between these two quantities and the ACL drives the oscillation amplitude towards the reference value $D_{ref}$. Filter 106 provides an output signal that is used to adjust the phase shift of filter 108 to maintain constant oscillation amplitude. By adjusting the phase shift of filter 108 variable damping is attained. Phase-shifting the force-feedback signal changes the fraction of the feedback force in phase with velocity. Since linear viscous forces are proportional to velocity, positive or negative linear damping may be generated electrically by positively or negatively phase-shifting the feedback force to add either positive or negative damping to shrink or grow the amplitude of oscillation respectively. The adjustable filter 108 nominally supplies a small amount of phase lag to overcome mechanical damping sources.

Figure 7A:
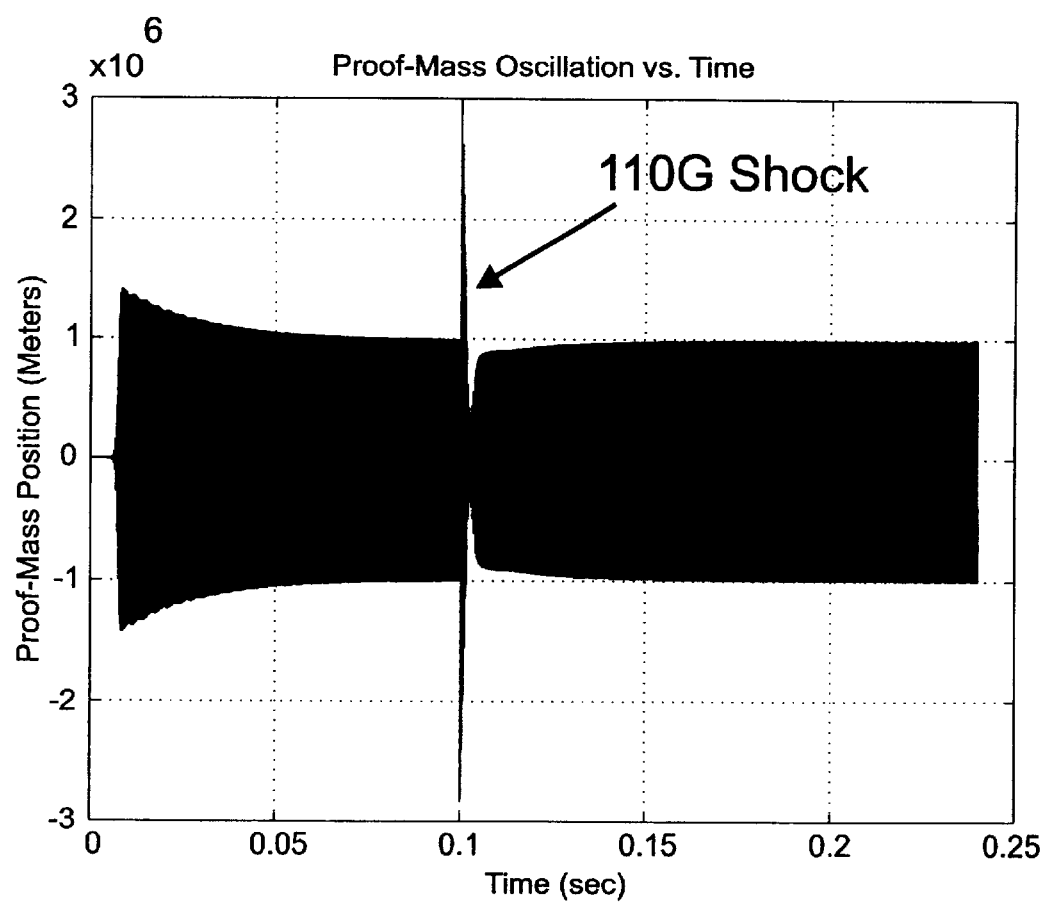
FIGS. 7(a,b) consists of two simulation results demonstrating the efficacy of the amplitude-control loop including rapid stabilization of oscillation at startup and response to a shock input.
Figure 7B:
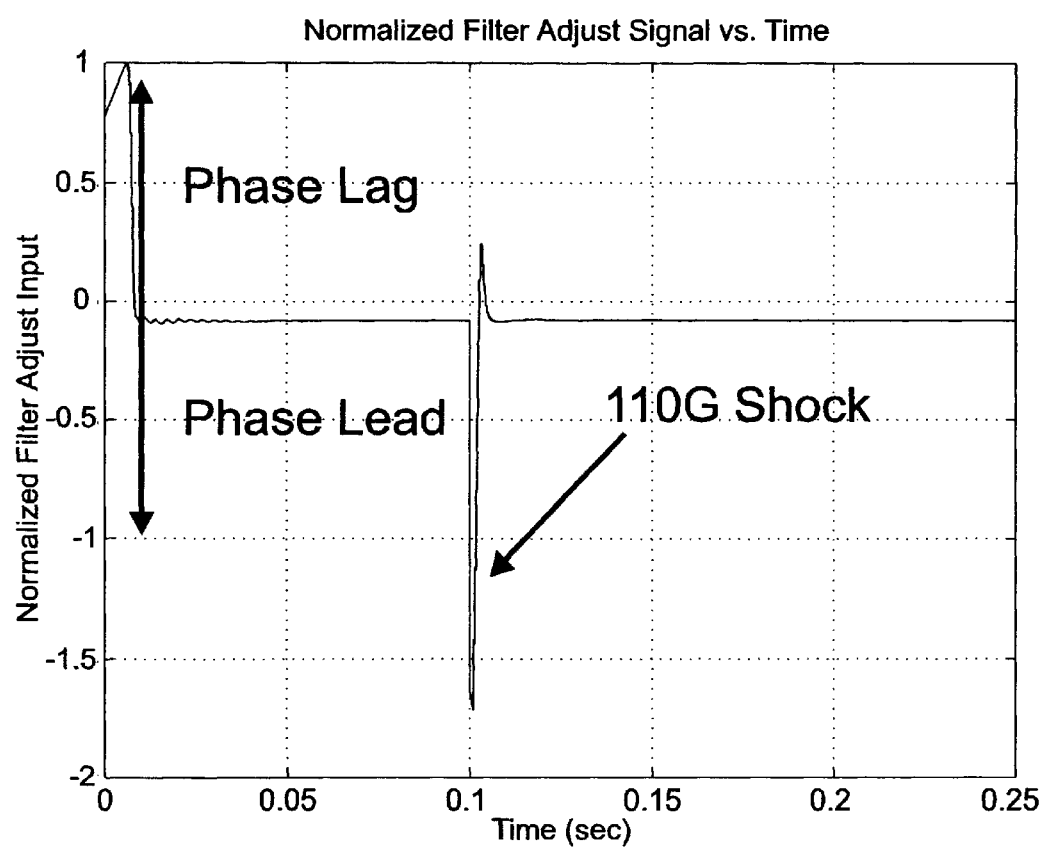

An advantage of this method of amplitude control is that large disturbances at input 110 are detected by the feedback loop and rapidly damped through the application of phase lead. FIG. 7(*a*) shows simulated response of the mechanical oscillation to a 110G (1G=9.8 m/s$^2$) shock. Note full recovery is obtained in less than 100 ms. FIG. 7(*b*) shows the output of filter 106. During startup, oscillation is too small so phase lag (negative damping) is generated by adjustable filter 108. When the shock occurs amplitude increases above the nominal value, thus phase lead (positive damping) is introduced to attenuate oscillation amplitude. Note that this method may be used to drive any type of proof-mass at or substantially near its mechanical natural frequency. The mechanical natural frequency is determined by a combination of the proof-mass, the suspension compliance, and any effective "electrical spring" realized by electrical means.

The adjustable filter 108 and other components of the feedback loop may be operated as either a discrete-time (sampled-data) or continuous-time system. In the sampled-data embodiment, continuous-to-discrete-time and discrete-to-continuous-time conversion is necessary since the mechanical system is inherently continuous time. The continuous-to-discrete-time conversion is achieved by sampling in the position-sense interface 104. Discrete-to-continuous-time force-feedback conversion is achieved through a holding circuit that may be a zero- or higher-order hold. The holding circuit may be contained within either the adjustable-filter block 108 or the static-gain block 109. Alternatively, a separate block may be added in the feedback path of the loop to implement this holding function. One effect of the holding circuit is to add a precisely controlled phase-delay to the feedback loop. The additional phase-delay changes the nominal amount of phase shift required from the adjustable filter 108.

Figure 6:
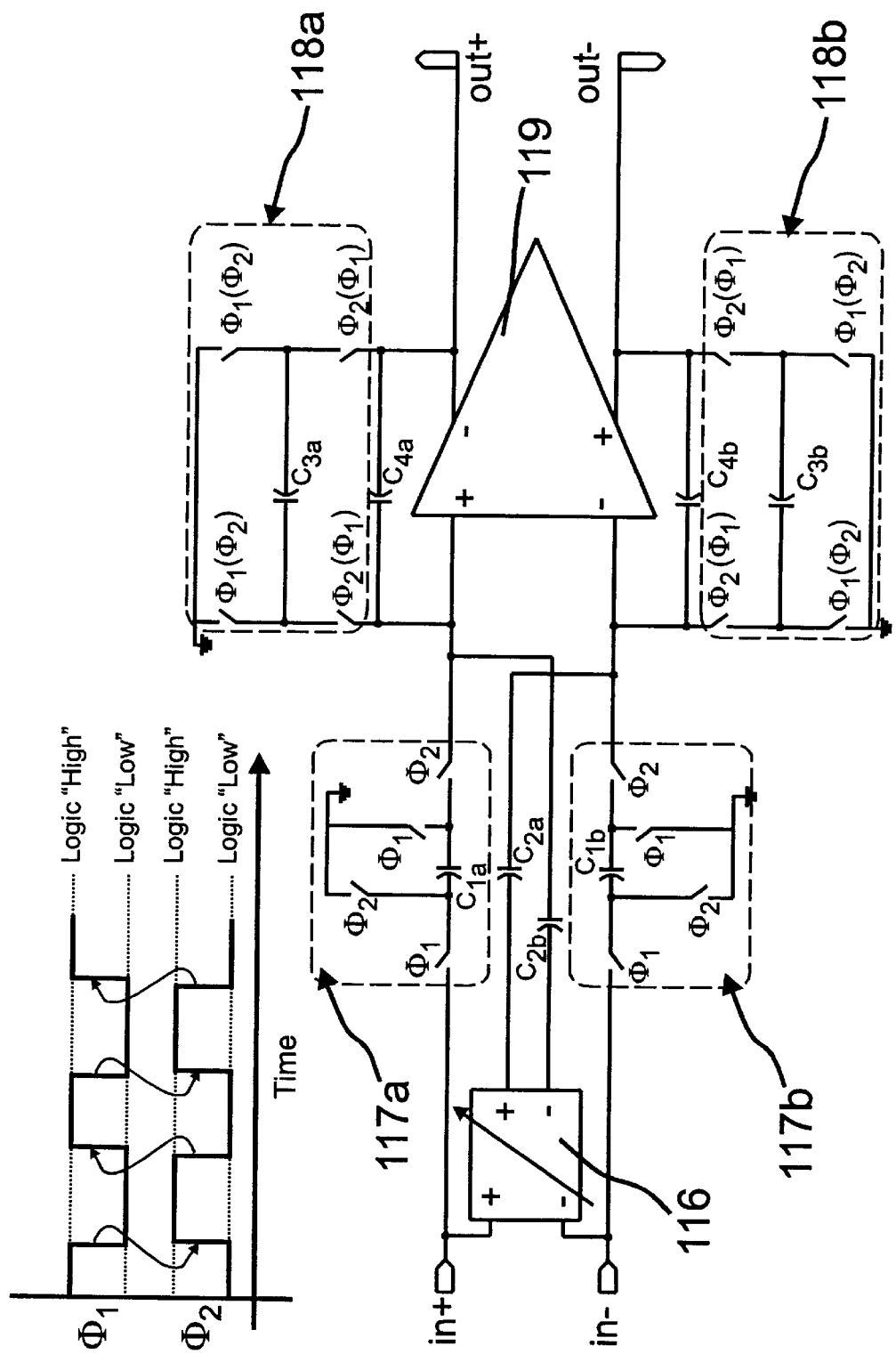
FIG. 6 is a schematic diagram of one possible embodiment of a tunable filter of the type needed for the amplitude control loop. Clock phases in parentheses represent an alternative clocking strategy.

An embodiment of a differential, discrete-time, adjustable filter is shown in FIG. 6. The filter embodiment shown in FIG. 6 is advantageous because the phase shift is continuously adjustable from negative values through positive values, while maintaining an approximately constant DC gain. Note, however, that many filters with an adjustable phase may work in the amplitude control loop. Two non-overlapping clock phases, $\phi_1$ and $\phi_2$, and are used to open and close switches in the filter. A logic "high" value corresponds to a closed switch, while a logic "low" value corresponds to an open switch. Switches may be realized with three-port active devices such as MOS transistors. The capacitors and switches 118a and 118b form switched-capacitor resistors which, when combined with capacitors $C_{4a}$, $C_{4b}$, and differential opamp 119, form a leaky charge-integrator. The capacitors and switches 117a and 117b sample the filter input during $\Phi_1$ and provide a corresponding charge at the opamp input during $\Phi_2$. Phase is adjusted through a variable-gain amplifier 116, which may provide both positive and negative gain. The output of the variable-gain amplifier is connected to the opamp input though capacitors $C_{2a}$ and $C_{2b}$, effecting an adjustable forward-path zero used to adjust the phase. The input to the complete filter or the variable-gain amplifier may be preceded by a holding circuit, such as a zero-order hold. The filter output may be followed by a holding circuit, such as a zero-order hold. Ratios of the capacitors $C_1$, $C_2$, $C_3$, and $C_4$ set both the DC gain and the dynamic characteristics of the filter.

A phase-locked loop 105 may be used to extract information about proof-mass oscillation including frequency and phase. The phase-locked loop locks to the output of the position sense interface 104 and generates digital signals which may be used for coordinating sampling and feedback operations throughout the gyroscope including, but not limited to, sampling of Coriolis accelerations and synchronous amplitude detection. By phase-locking onto the output of the position-sense interface 104 minimal phase errors are introduced.

Figure 8:
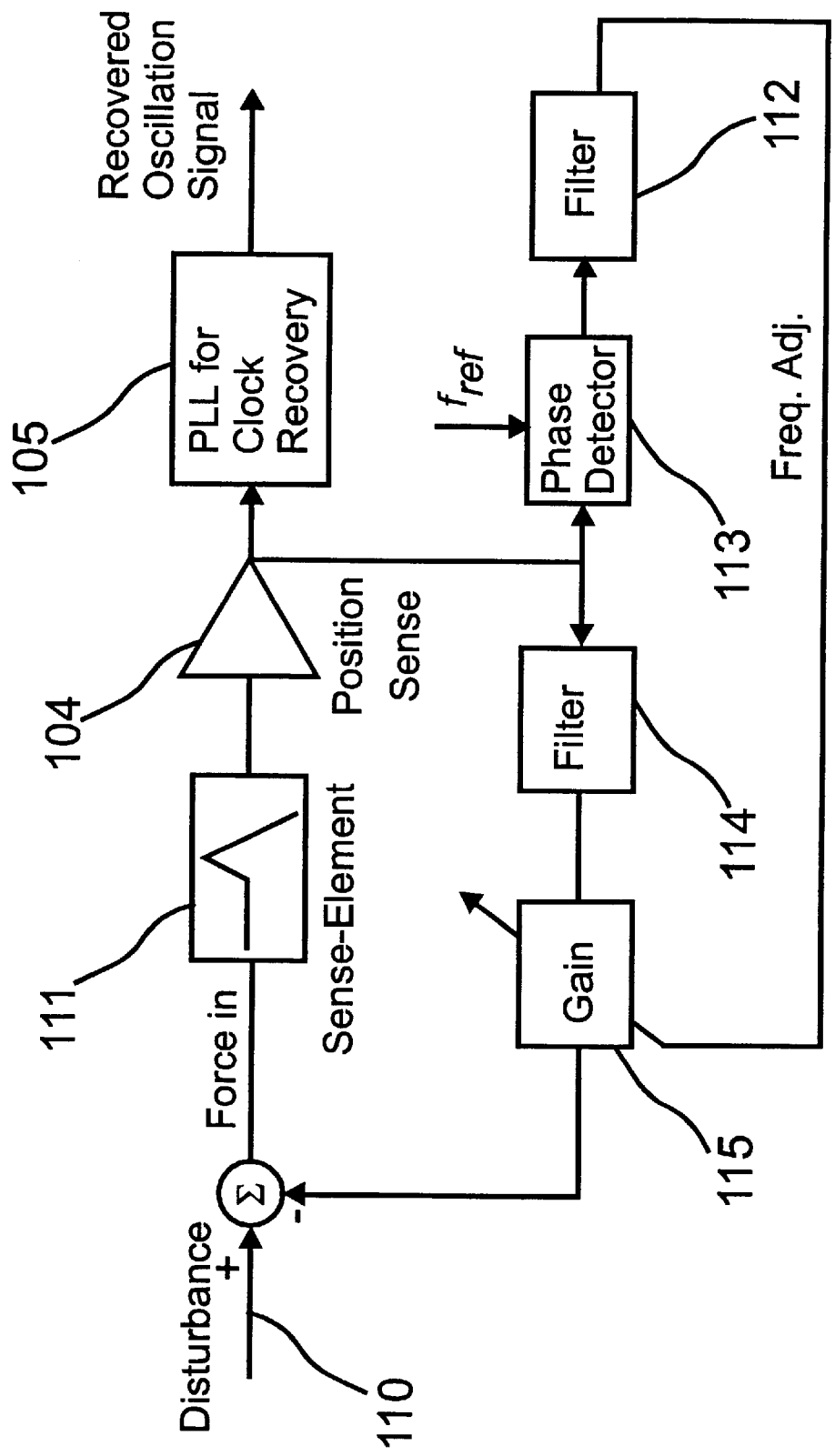
FIG. 8 is a block diagram showing important system elements and connections between these system elements comprising the frequency-control feedback-loop embodiment.

FIG. 8 is a block diagram of the second embodiment of the invention. By varying the position-feedback gain 115 the oscillation frequency at which the proof-mass vibrates may be adjusted. The oscillation frequency is set by:

$$f_r = \frac{1}{2\pi}\sqrt{\frac{k_e + k_m}{m}} \qquad \text{Equation 7}$$

where $k_e$ is the electrical spring constant, $k_m$ the mechanical spring constant and m is the mass of the proof mass. An electrical spring is realized through proportional feedback of position; positive feedback of position yields a negative "electrical spring" (lowering natural frequency) while negative feedback yields a positive electrical spring (raises natural frequency). By changing the "electrical spring" the resonant frequency may be altered. Using a feedback loop, the proof-mass frequency may be driven towards a highly-stable reference frequency, $f_{ref}$—for example as provided by a quartz oscillator. The feedback loops, comprised of elements 104, 111, 112, 113, 114, 115 realize a phase-locked-loop in which the mechanical structure acts as a controllable oscillator with frequency control adjusted by the tunable gain block 115. Phase detector 113 compares the oscillation frequency to a reference frequency and provides an output signal that is filtered by filter 112, the output of filter 112 being used to adjust gain 115 to maintain constant oscillation frequency. The phase-detector may be physically realized through either a true phase detector, such as a multiplier, or a phase-frequency detector for a greater tuning range. The variable gain may be realized by adjustment of either $V_{dc}$ or amplification of $v_x$ as shown in equations 3, 4, and 5.

Figure 9:
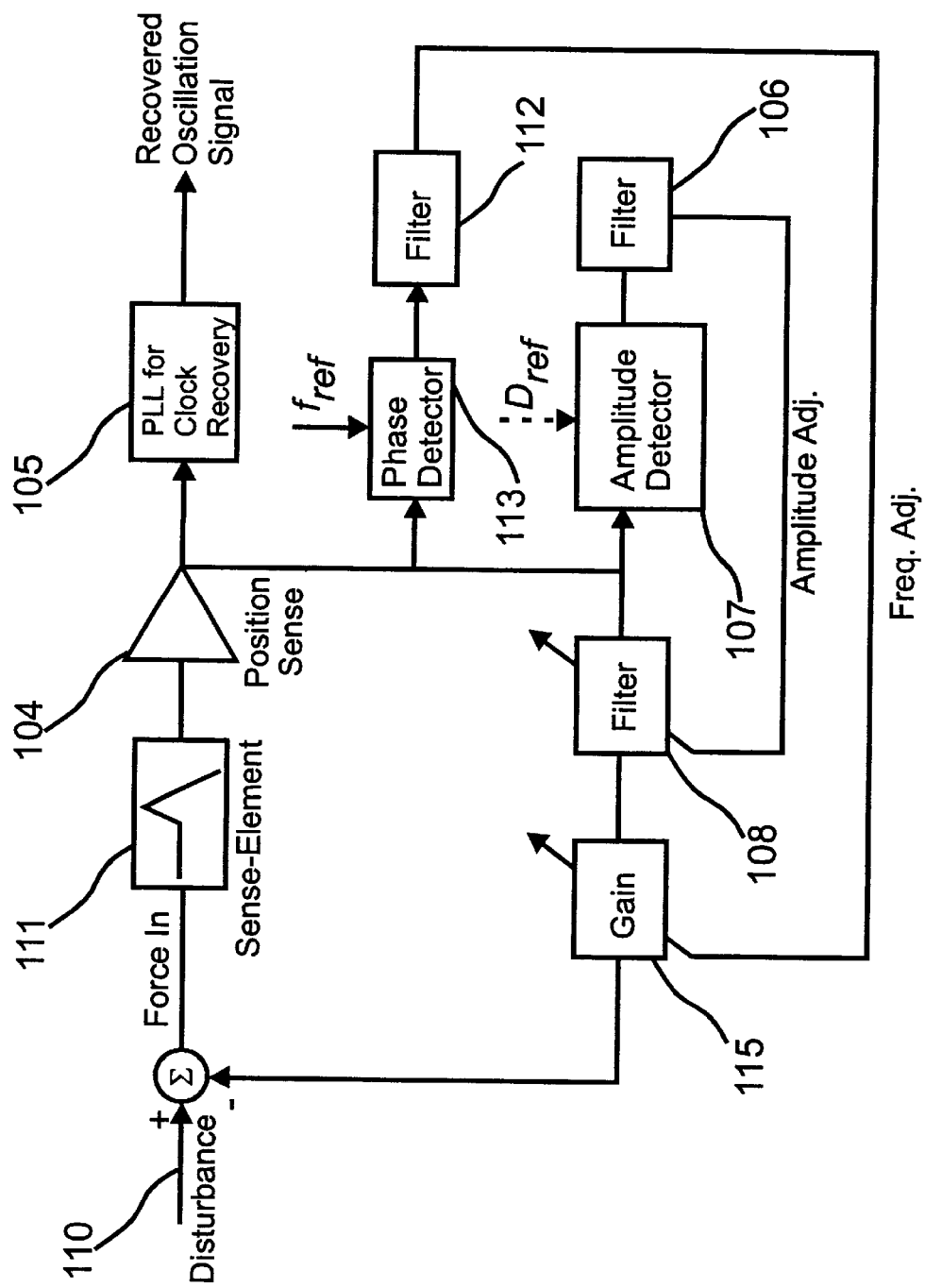
FIG. 9 is a block diagram showing important system elements and connections between these system elements comprising the frequency-tuned oscillation-drive loop with both frequency and amplitude feedback loops for improved oscillation stability.
Figure 10:
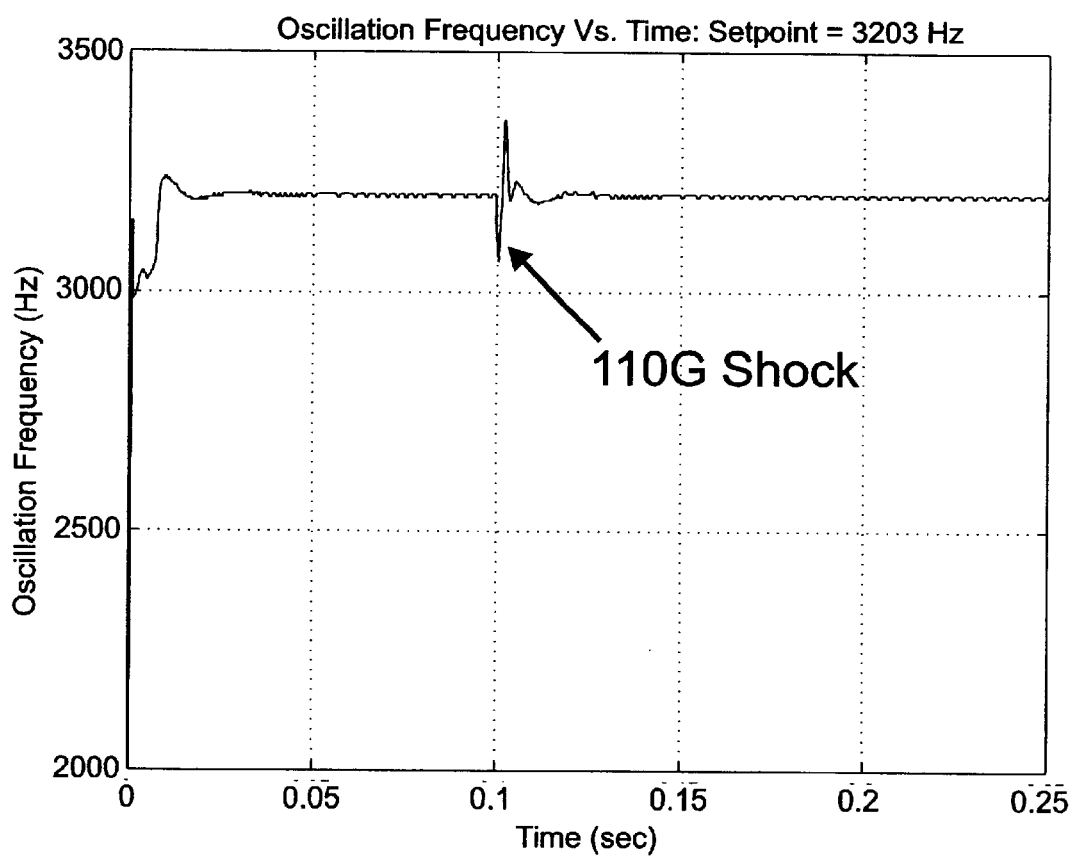
FIG. 10 is a plot of simulation results demonstrating the efficacy of the combined frequency and amplitude-control loops.

A third embodiment of the invention is shown in FIG. 9. To achieve a highly-stable oscillation loop, the ACL and the frequency-tuning loop described above may be combined resulting in an oscillation with controlled amplitude and a constant frequency. The combination of these two feedback loops fixes the two parameters affecting scale-factor and drift shown in equation 1, while simultaneously providing good disturbance rejection. A system block diagram of the combined feedback loops is shown in FIG. 9. FIG. 10 shows simulated proof-mass frequency vs. time with a 3203 Hz setpoint ($f_{ref}$).

The foregoing description, for the purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the invention are presented for the purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An oscillation-sustaining system for a vibrating microstructure comprising:
   a microstructure having a resonant frequency anchored to a substrate by a suspension having compliance along a dither axis;
   a sensor for measuring displacement of the microstructure along the dither axis;
   sensing circuitry to infer positioning of the microstructure based upon an output of the sensor;
   an amplitude detection circuit having an output;
   a filter circuit for filtering the output of the amplitude-detection circuit;
   a filter having a phase shift about the resonant frequency, the phase shift having a magnitude and a sign which are adjustable by the filtered representation of the amplitude-detection circuit output; and
   a force transducer for applying an oscillation-sustaining force along the dither axis based upon a phase-shifted representation of the microstructure position.

2. The system of claim 1 wherein the sensor includes:
   a first substantially stationary conductive comb anchored to said substrate having a plurality of fingers extending towards the microstructure; and
   a second conductive comb connected to the microstructure having a plurality of fingers that interdigitate with the fingers of the first comb, the first and second combs forming electrodes of a first capacitor with capacitance changing for displacements along the dither axis.

3. The system of claim 1 wherein the force transducer includes:
   a third substantially stationary conductive comb anchored to said substrate having a plurality of fingers extending towards the microstructure; and
   a fourth conductive comb connected to the microstructure having a plurality of fingers that interdigitate with the fingers of the third comb, the third and fourth combs forming electrodes of a second capacitor with capacitance changing for displacements along the dither axis.

4. The system of claim 2 wherein said first capacitor is additionally used as a force transducer by time multiplexing connectivity of said first capacitor between a position-sense interface and a pair of terminals having a voltage across the pair.

5. The system of claim 2 wherein said first capacitor is additionally used as a force transducer using frequency multiplexing of voltages applied to said first capacitor.

6. The system of claim 1 wherein said sensing circuitry, said amplitude detection circuit, and said filter having a phase shift about the resonant frequency operate at discrete time periods.

7. The system of claim 1 wherein said sensing circuitry, said amplitude detection circuit, and said filter having a phase shift about the resonant frequency, operate continuously.

8. The system of claim 1 additionally including a phase-locked loop for synchronization of a clock circuit to the position of the microstructure during oscillation.

9. An oscillation-sustaining system for a vibrating microstructure comprising:
   a microstructure having a resonant frequency anchored to a substrate by a suspension having compliance along a dither axis;
   a sensor for measuring displacement of the microstructure along the dither axis;

sensing circuitry to determine the position of the microstructure based upon an output of the sensor;

a reference frequency;

a phase detection circuit having an output;

a filter circuit for filtering the output of the phase detection circuit;

a filter having a substantially constant phase shift about the resonant frequency;

a circuit producing a gain having a magnitude which is adjustable by the filtered representation of the output of the phase-detection circuit; and a force transducer for applying an oscillation-sustaining force along the dither axis based upon a phase-shifted representation of the microstructure position.

10. The system of claim 9 wherein the sensor includes:

a first substantially stationary conductive comb anchored to said substrate having a plurality of fingers extending towards the microstructure; and a second conductive comb connected to the microstructure having a plurality of fingers that interdigitate with the fingers of the first comb, the first and second combs forming electrodes of a first capacitor with capacitance changing for displacements along the dither axis.

11. The system of claim 9 wherein the force transducer includes:

a third substantially stationary conductive comb anchored to said substrate having a plurality of fingers extending towards the microstructure; and a fourth conductive comb connected to the microstructure having a plurality of fingers that interdigitate with the fingers of the third comb, the third and fourth combs forming electrodes of a second capacitor with capacitance changing for displacements along the dither axis.

12. The system of claim 10 wherein said first capacitor is additionally used as a force transducer by time multiplexing connectivity of said first capacitor between a position-sense interface and a pair of terminals having a voltage across the pair.

13. The system of claim 10 wherein said first capacitor is additionally used as a force transducer using frequency multiplexing of voltages applied to said first capacitor.

14. The system of claim 9 wherein said sensing circuitry, said phase detection circuit, and said filter having a substantially constant phase shift about the resonant frequency operate at discrete time periods.

15. The system of claim 9 wherein said sensing circuitry, said phase detection circuit, and said filter having a substantially constant phase shift about the resonant frequency operate.

16. The system of claim 9 additionally including a phase-locked loop for synchronization of a clock circuit to the position of the microstructure during oscillation.

17. An oscillation-sustaining system for a vibrating microstructure comprising:

a microstructure having a resonant frequency anchored to a substrate by a suspension having compliance along a dither axis;

a sensor for measuring displacement of the microstructure along the dither axis;

sensing circuitry to determine the position of the microstructure based upon an output of the sensor;

an amplitude detection circuit having an output;

a filter circuit for filtering the output of the amplitude-detection circuit;

a filter having a phase shift about the resonant frequency, the phase shift having a magnitude and a sign which are adjustable by the filtered representation of the amplitude-detection circuit output;

a reference frequency;

a phase-detection circuit having an output;

a filter circuit for filtering the output of the phase-detection circuit;

a circuit outputting a gain having a magnitude adjustable by the filtered representation of the phase-detection circuit output; and a force transducer for applying an oscillation-sustaining force along the dither axis, where the input to the transducer is a phase-shifted representation of the microstructure position.

18. The system of claim 17 wherein the sensor includes:

a first substantially stationary conductive comb anchored to said substrate having a plurality of fingers extending towards the microstructure; and a second conductive comb connected to the microstructure having a plurality of fingers that interdigitate with the fingers of the first comb, the first and second combs forming electrodes of a first capacitor with capacitance changing for displacements along the dither axis.

19. The system of claim 17 wherein the force transducer includes:

a third substantially stationary conductive comb anchored to said substrate having a plurality of fingers extending towards the microstructure; and a fourth conductive comb connected to the microstructure having a plurality of fingers that interdigitate with the fingers of the third comb, the third and fourth combs forming electrodes of a second capacitor with capacitance changing for displacements along the dither axis.

20. The system of claim 18 wherein said first capacitor is additionally used as a force transducer by time multiplexing connectivity of said first capacitor between a position-sense interface and a pair of terminals having a voltage across the pair.

21. The system of claim 18 wherein said first capacitor is additionally used as a force transducer using frequency multiplexing of voltages applied to said first capacitor.

22. The system of claim 17 wherein said sensing circuitry, said amplitude detection circuit, said phase detection circuit, and said filter having a phase shift about the resonant frequency, operate at discrete time periods.

23. The system of claim 17 wherein said sensing circuitry, said amplitude detection circuit, said phase detection circuit, and said filter having a phase shift about the resonant frequency, operate continuously.

24. The system of claim 17 additionally including a phase-locked loop for synchronization of a clock circuit to the position of the microstructure during oscillation.

* * * * *